US009854611B2

United States Patent
VanBlon et al.

(10) Patent No.: US 9,854,611 B2
(45) Date of Patent: Dec. 26, 2017

(54) GROUP NETWORK ACQUISITION

(71) Applicant: LENOVO (Singapore) PTE. LTD., New Tech Park (SG)

(72) Inventors: Russell Speight VanBlon, Raleigh, NC (US); John Carl Mese, Cary, NC (US); Nathan J. Peterson, Oxford, NC (US)

(73) Assignee: Lenovo (Singapore) PTE. LTD., New Tech Park (SG)

( * ) Notice: Subject to any disclaimer, the term of this patent is extended or adjusted under 35 U.S.C. 154(b) by 25 days.

(21) Appl. No.: 15/087,336

(22) Filed: Mar. 31, 2016

(65) Prior Publication Data

US 2017/0290068 A1 Oct. 5, 2017

(51) Int. Cl.
*H04W 72/00* (2009.01)
*H04W 76/02* (2009.01)
*H04W 72/12* (2009.01)

(52) U.S. Cl.
CPC ......... *H04W 76/02* (2013.01); *H04W 72/121* (2013.01); *H04W 72/1252* (2013.01)

(58) Field of Classification Search
CPC ............... H04W 76/02; H04W 72/121; H04W 72/1252
USPC .... 455/404.2, 412.1–412.2, 418–422.1, 444, 455/436, 552.1, 550.2, 434, 443, 450, 455/509, 457.1, 457, 67.11, 67.13, 455/41.1–41.2, 572–574; 370/311, 252, 370/328–332, 338
See application file for complete search history.

(56) References Cited

U.S. PATENT DOCUMENTS

| | | | | |
|---|---|---|---|---|
| 9,386,617 | B2 * | 7/2016 | Venkatachalam | H04W 8/005 |
| 2002/0090949 | A1 * | 7/2002 | Stanforth | H04W 40/10 455/445 |
| 2010/0261469 | A1 * | 10/2010 | Ribeiro | H04W 99/00 455/423 |
| 2011/0128946 | A1 * | 6/2011 | Saito | H04W 8/005 370/338 |
| 2014/0064198 | A1 * | 3/2014 | Pan | H04W 76/02 370/329 |
| 2014/0112194 | A1 * | 4/2014 | Novlan | H04W 8/005 370/254 |
| 2015/0004901 | A1 * | 1/2015 | Agiwal | H04W 76/023 455/39 |
| 2015/0230160 | A1 * | 8/2015 | Lin | H04W 48/16 370/252 |
| 2015/0230180 | A1 * | 8/2015 | Lim | H04W 52/0235 370/311 |
| 2015/0304896 | A1 * | 10/2015 | Turtinen | H04W 36/00 370/331 |

(Continued)

*Primary Examiner* — Babar Sarwar
(74) *Attorney, Agent, or Firm* — Kunzler PC

(57) ABSTRACT

For group network acquisition, systems, apparatus, methods, and program products are disclosed. The apparatus may include a radio transceiver for communicating on a mobile communication network, a processor, and a memory that stores code executable by the processor. In one embodiment, the processor detects a connection status of the radio transceiver and forms a group with a communication device based on the network status. In a further embodiment, the processor attempts network acquisition for the group during an assigned connection period and ceases network acquisition attempts during an unassigned connection period.

21 Claims, 6 Drawing Sheets

(56) References Cited

U.S. PATENT DOCUMENTS

| | | | |
|---|---|---|---|
| 2016/0037569 A1* | 2/2016 | Kim | H04W 4/008 455/450 |
| 2016/0112977 A1* | 4/2016 | Byun | H04W 56/0015 370/350 |
| 2016/0150582 A1* | 5/2016 | Jung | H04W 12/04 455/41.1 |

* cited by examiner

GROUP NETWORK ACQUISITION

FIELD

The subject matter disclosed herein relates to communication networks and more particularly relates to distributed network acquisition among a group of communication devices.

BACKGROUND

Description of the Related Art

Mobile phones can rapidly deplete battery power when connected to the mobile network using an unreliable or weak signal. A user can turn off the mobile phone, but this renders the device unusable for other purposes. Network polling frequency can be decreased to conserve power when no signal is present, but network polling frequency does not affect battery usage for a weak signal condition.

BRIEF SUMMARY

An apparatus for distributed network acquisition among a group of communication devices is disclosed. A method and computer program product also perform the functions of the apparatus.

The apparatus may include a radio transceiver for communicating on a mobile communication network, a processor, and a memory that stores code executable by the processor. In one embodiment, the processor detects a connection status of the radio transceiver and forms a group with a communication device based on the connection status. In a further embodiment, the processor attempts network acquisition for the group during an assigned connection period and ceases network acquisition attempts during an unassigned connection period.

In some embodiments, the device receives a group invite from a nearby communication device reporting the connection status. The processor identifies a device parameter of the nearby communication device and accepts the group invite based on the device parameter. In certain embodiments, the processor activates a secondary radio transceiver in response to the processor detecting the connection status of the main radio transceiver. In such embodiments, the processor receiving the group invite includes the processor receiving the group invite via the secondary radio transceiver.

In some embodiments, the processor negotiates a network connection schedule for the group. In such embodiments, the network connection schedule indicates the assigned connection period and at least one unassigned connection period. The unassigned connection periods are assigned to at least one other communication device belonging to the group. In certain embodiments, the processor communicates over the mobile communication network using a network connection shared by the group. In some embodiments, the processor forming the group based on the connection status includes forming the group in response to the processor detecting a connection status selected from the group consisting of: a lost connection state, a weak signal status, and an excessive power consumption status.

The method may include detecting, by way of a processor, a connection status for a main radio transceiver of the communication device, forming a group with another communication device based on the connection status, attempting network acquisition for the group during an assigned connection period and ceasing network acquisition attempts during an unassigned connection.

In some embodiments, forming a group with another communication device based on the connection status includes polling for nearby communication devices and receiving a response from at least one nearby communication device. In one embodiment, the response includes a connection status for the responding communication device. In further embodiments forming the group includes transmitting a group invite to each nearby communication device reporting the detected connection status. In certain embodiments, the method includes activating a secondary radio transceiver based on the connection status of the main radio transceiver and polling for nearby communication devices via the secondary radio transceiver.

In a further embodiment, the method includes detecting a network overload condition of the secondary radio transceiver, activating a tertiary radio transceiver in response to detecting the network overload condition, polling for nearby communication devices using the tertiary radio transceiver, and reforming the group based on polling responses received via the tertiary radio transceiver. In certain embodiments, the method includes identifying device parameters for the communication device and receiving device parameters for each nearby communication device responding to the poll. In such embodiments, forming the group further includes excluding each nearby communication device having device parameters different from the identified device parameters.

In some embodiments, the method includes negotiating a network connection schedule for the group. In such embodiments, the network connection schedule indicates the assigned connection and at least one unassigned connection period. In certain embodiments, the method includes receiving a power state for each communication device in the group. In such embodiments, negotiating the network connection schedule includes allocating an amount of time to each communication device in the group based on the power state for the communication device.

In certain embodiments, the method includes sharing a network connection with a communication device in the group. In some embodiments, the method includes receiving a group invite from a nearby communication device, determining whether the nearby communication device reports a connection status, and accepting the group invite in response to the nearby communication device reporting the detected connection status. In certain embodiments, the connection status for the main radio transceiver indicates a particular mobile communication network. In such embodiments, forming the group includes forming a group with a communication device that uses the particular mobile communication network.

The computer program product includes a computer readable storage medium that stores code executable by a processor, the executable code including code to perform: detecting a connection status of a radio transceiver, forming a group with a communication device based on the connection status, attempting network acquisition during an assigned connection period and ceasing network acquisition attempts during an unassigned connection period.

In some embodiments, the executable code includes code to perform: negotiating a network connection schedule for the group, where the network connection schedule indicates the assigned connection period and at least one unassigned connection period. In further embodiments, the executable code is code to perform: sharing a network connection with at least one communication device in the group.

In certain embodiments, the connection status of the radio transceiver indicates a particular mobile communication network. In such embodiments, forming the group includes forming a group with a communication device that uses the particular mobile communication network. In one embodiment, the connection status indicates: an absence of a network signal, a weak network signal, an unreliable network signal, a tower overload condition, or a wireless interference condition.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

Figure 1A:
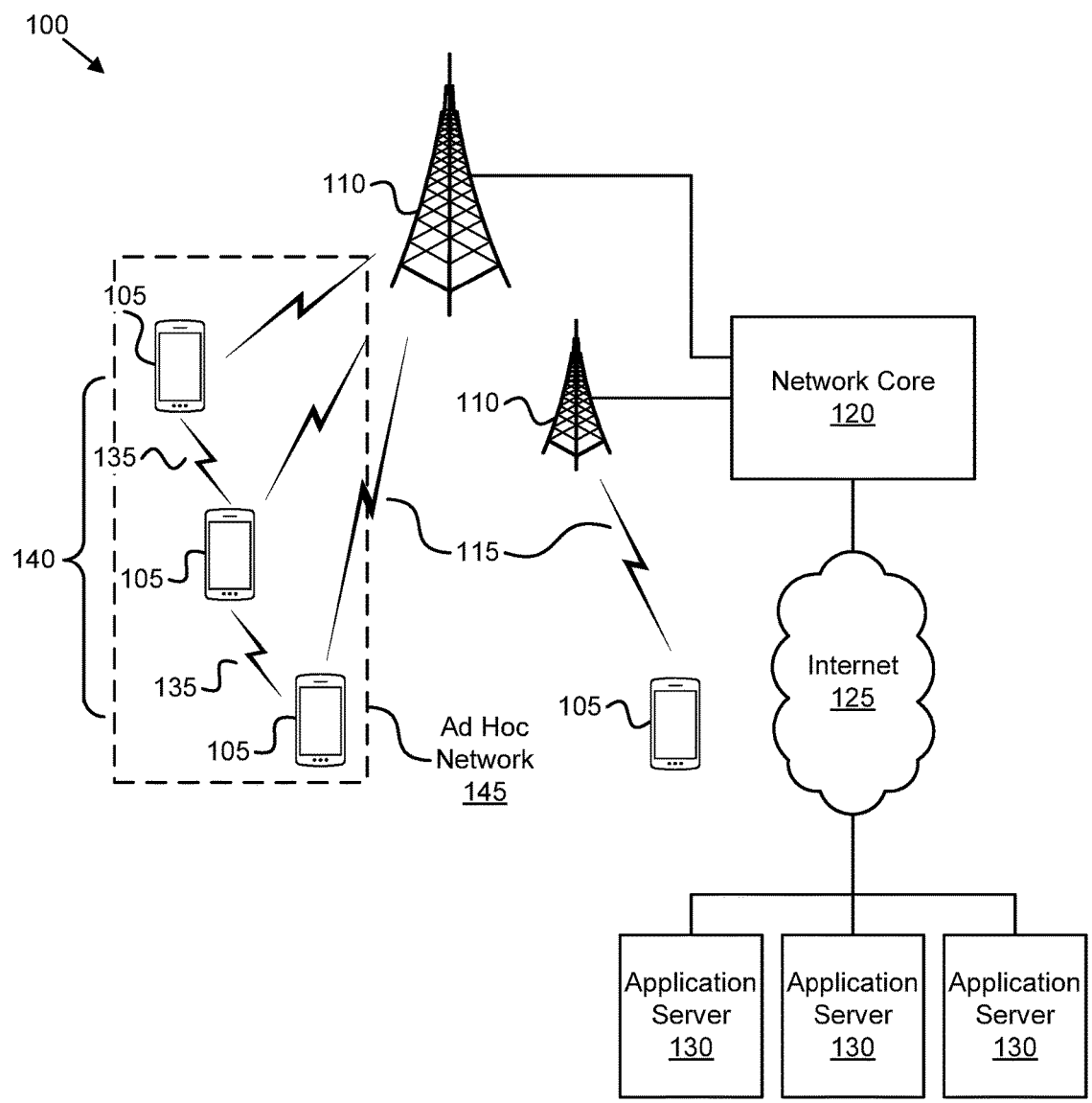
FIG. 1A is a schematic block diagram illustrating one embodiment of a system for distributed network acquisition among a group of communication devices.

As will be appreciated by one skilled in the art, aspects of the embodiments may be embodied as a system, method, or program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a program product embodied in one or more computer readable storage devices storing machine readable code, computer readable code, and/or program code, referred hereafter as code. The storage devices may be tangible, non-transitory, and/or non-transmission. The storage devices may not embody signals. In a certain embodiment, the storage devices only employ signals for accessing code.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices, or the like.

Modules may also be implemented in code and/or software for execution by various types of processors. An identified module of code may, for instance, comprise one or more physical or logical blocks of executable code which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different computer readable storage devices. Where a module or portions of a module are implemented in software, the software portions are stored on one or more computer readable storage devices.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Code for carrying out operations for embodiments may be written in any combination of one or more programming languages including an object oriented programming language such as Python, Ruby, Java, Smalltalk, C++, or the like, and conventional procedural programming languages, such as the "C" programming language, or the like, and/or machine languages such as assembly languages. The code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. These code may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams block or blocks.

The code may also be loaded onto a computer, other programmable data processing apparatus, or other devices to cause a series of operational steps to be performed on the computer, other programmable apparatus or other devices to produce a computer implemented process such that the code which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods, and program products according to various embodiments. In this regard, each block in the schematic flowchart diagrams and/or schematic block diagrams may represent a module, segment, or portion of code, which comprises one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each figure may refer to elements of proceeding figures. Like numbers refer to like elements in all figures, including alternate embodiments of like elements.

Generally, the systems, apparatus, method, and program products described herein maximize battery life for a mobile communication device experiencing excessive power consumption by a radio transceiver, for example due to an unreliable or weak signal. Power savings are achieved by sharing network acquisition duties among a group of mobile communication devices. For example, when the mobile communication device experiences a no signal condition, a weak signal condition, an unreliable signal condition, a tower overload condition, and/or wireless interference condition, it looks for other nearby devices to help carry the burden of acquiring a signal and connecting to the network.

Mobile communication devices may communicate with one another via an ad hoc wireless network including, but not limited to, an ad hoc Wi-Fi network, a Bluetooth network, an ad hoc cellular network, and the like. The devices in the group to negotiate a schedule for attempting signal/network acquisition. Each device may be scheduled a connection period based on round-robin scheduling, token/credit-based scheduling, fair queuing scheduling, or other scheduling methods.

During a particular mobile communication device's scheduled connection period, the mobile communication device attempts network acquisition while all other mobile communication devices in the group conserve power by ceasing network acquisition attempts. The active (e.g., scheduled) mobile communication device may report the results of its network acquisition attempt to members of the group. The active mobile communication device may also share its network connection with other devices using a lower-powered radio transceiver, for example by hosting a Wi-Fi hotspot or using Bluetooth to share a cellular network connection. At the end of the scheduled connection period, the active mobile communication device transfers network acquisition/communication duties to the next scheduled mobile communication device and conserves power. In this way, the group of mobile communication devices all experiencing excessive radio transceiver power consumption (e.g., due to a weak or unreliable network signal/connection) share the burden of network acquisition, thereby conserving power and extending battery life.

FIG. 1A is a schematic block diagram illustrating a communication system 100 for distributed network acquisition among a group of communication devices, according to embodiments of the disclosure. The communication system 100 comprises a plurality of communication devices 105 and a plurality of base units 110. In one embodiment, the communication device 105 may include computing devices, such as desktop computers, laptop computers, personal digital assistants ("PDAs"), tablet computers, smart phones, smart televisions (e.g., televisions connected to the Internet), set-top boxes, game consoles, security systems (including security cameras), vehicle on-board computers, network devices (e.g., routers, switches, modems), or the like. In some embodiments, the communication device 105 include wearable devices, such as smart watches, fitness bands, optical head-mounted displays, or the like. Moreover, the communication devices 105 may be referred to as subscriber units, mobiles, mobile stations, users, terminals, mobile terminals, fixed terminals, subscriber stations, UE, user terminals, a device, or by other terminology used in the art.

Each communication device 105 connects wirelessly to a base unit 110 via a primary wireless connection 115, the primary wireless connection 115 conforming to a first wireless communication protocol. Typically, the primary wireless connection 115 is for long-range wireless communication. In one embodiment, the first wireless communication protocol is a cellular communication standard, such as the LTE standard developed by the 3GPP, or similar wireless communication standard.

The base units 110 are connected to a network core 120, such as an evolved packet core ("EPC") or similar packet core. The base units 110 may be distributed over a geographic region. In certain embodiments, a base unit 110 may also be referred to as an access point, an access terminal, a base, a base station, a Node-B, an eNB, a Home Node-B, a relay node, a device, or by any other terminology used in the art. The base units 110 are generally part of a radio access network that may include one or more controllers communicably coupled to one or more corresponding base units 110. The base units 110 may serve a number of communication devices 105 within a serving area, for example, a cell or a cell sector via a wireless communication link. The base units 110 may communicate directly with one or more of the communication devices 105 via the primary wireless connection 115.

The base unit 110 and the network core 120 form a mobile communication network, such as a public land mobile network ("PLMN"). A communication device 105 may access another network, such as the Internet 125 or a public switched telephone network ("PSTN"), among other networks, and/or may access an application server 130, via the base unit one 110 and the network core 120. Accordingly, the base unit 110 and the network core 120 provide interface allowing a communication device 105 to communicate wirelessly with the Internet 125, an application server 130, etc.

Additionally, the communication devices 105 may communicate with one another via at least one secondary wireless connection 120. Typically, the secondary wireless connections 120 are for short-range wireless communication, while the primary wireless connection 115 is for long-range wireless communication. For example, a secondary wireless connection 120 may be a Wi-Fi connection, a wireless local area network ("WLAN") connection, a Bluetooth connection, a wireless personal area network ("PAN") connection, or similar wireless network connection.

The communication devices 105 may form in ad hoc wireless network 145 using the at least one secondary wireless connection 120. As used herein, an "ad hoc" wireless network refers to a self-configuring, decentralized wireless network that does not rely on managed infrastructure, such as the base unit 110 and the network core 120, to form the network. Instead, each communication device 105 in the ad hoc wireless network 145 may perform routing functions by forwarding data to other communication devices 105. The ad hoc wireless network 145 may be dynamic, allowing communication devices 105 to enter and leave at will. Accordingly, communication devices 105 in the ad hoc wireless network 145 may dynamically determine data transfer routes when forwarding data.

As depicted, an ad hoc wireless network 145 may comprise a subset of the mobile communication devices 105 in the communication system 100. A communication device 105 may initiate the ad hoc wireless network 145 in response to detecting a particular connection status (among a plurality of candidate connection statuses) and form a group 140 that communicates via the ad hoc network 145. In the depicted embodiment, only members of the group 140 communicate over the ad hoc network 145. In other embodiments, at least one communication device 105 that is not a part of the group 140 may communicate over the ad hoc network 145.

As an example, upon experiencing a poor signal (or poor network connection status) via the primary wireless connection 115, a communication device 105 will seek out a group 140 of communication devices 105 also experiencing network connection difficulties. In one embodiment, communication devices 105 will form a group 140 of devices experiencing similar network connection difficulties (e.g., reporting the same connection status). In other embodiments, the communication devices will form a group 140 of devices experiencing network connection difficulties with same combination of base unit 110 and network core 120. Group formation is discussed in further detail below.

Although FIG. 1 depicts a specific number of communication devices 105, base units 110, primary wireless connections 115, network cores 120, application servers 130, secondary wireless connection 135, groups 140, and ad hoc networks 145, one of skill in the art will recognize that the system 100 is not limited to the specific numbers shown. Further, the present disclosure is not intended to be limited to the implementation of any particular wireless communication system architecture or protocol.

Figure 1B:
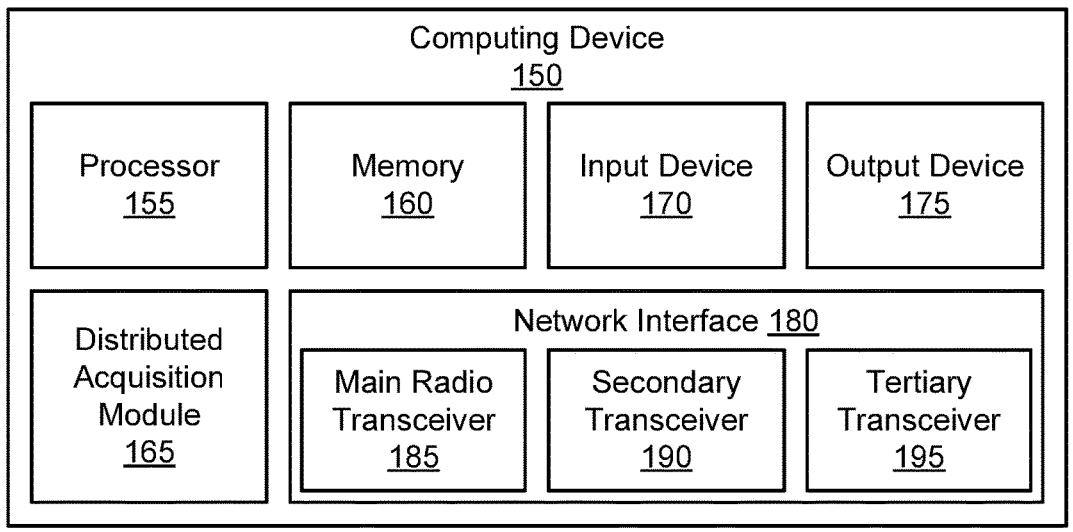
FIG. 1B is a schematic block diagram illustrating one embodiment of a computing device used in the system of FIG. 1A.

FIG. 1B is a schematic block diagram illustrating a computing device 150 for distributed network acquisition among a group of communication devices, according to embodiments of the disclosure. In certain embodiments, the computing device 150 may be an embodiment of mobile communication device 105. Examples of a computing device 150 include, but are not limited to, a mobile phone, a smart phone, a tablet computer, a laptop computer, a handheld computer, a wearable computer, a portable gaming console, and the like. In one embodiment, the computing device 150 includes a processor 155, a memory 160, a distributed acquisition module 165, an input device 170, an output device 175, and a network interface 180 having a main radio transceiver 185, a secondary radio transceiver 190, and (optionally) a tertiary radio transceiver 195.

The processor 155, in one embodiment, may comprise any known controller capable of executing computer-readable instructions and/or capable of performing logical operations. For example, the processor 155 may be a microcontroller, a microprocessor, a central processing unit (CPU), a graphics processing unit (GPU), an auxiliary processing unit, a FPGA, or similar programmable controller. In certain embodiments, the processor 155 may include a plurality of processing units, such as a plurality processing cores, a plurality of CPUs, a plurality of microcontrollers, or the like. In some embodiments, the processor 155 executes instructions stored in the memory 160 to perform the methods and routines described herein. The processor 155 is communicatively coupled to the memory 160, the distributed acquisition module 165, the input device 170, the output device 175, and the network interface 180.

The memory 160, in one embodiment, is a computer readable storage medium. In some embodiments, the memory 160 includes volatile computer storage media. For example, the memory 160 may include a random access memory (RAM), including dynamic RAM (DRAM), synchronous dynamic RAM (SDRAM), and/or static RAM (SRAM). In some embodiments, the memory 160 includes non-volatile computer storage media. For example, the memory 160 may include a hard disk drive, a flash memory, or any other suitable non-volatile computer storage device. In some embodiments, the memory 160 includes both volatile and non-volatile computer storage media.

In some embodiments, the memory 160 stores additional data relating to confining data 110 based on location. For example, the memory 160 may store a connection status, a transceiver power consumption status, a location, a device parameter, and the like. In some embodiments, the memory 160 also stores program code and related data, such as an operating system or other controller algorithms operating on the computing device 150.

The distributed acquisition module 165, in one embodiment, detects a connection status of a radio transceiver, forms a group with a communication device based on the connection status, attempts network acquisition for the group during an assigned connection period, and ceases network acquisition attempts during an unassigned connection period. In certain embodiments, the distributed acquisition module 165 may negotiate a network connection schedule for the group, the network connection schedule indicating connection period assignments among the group of communication devices. In further embodiments, the distributed acquisition module 165 may facilitate sharing a network connection, for example, in response to a member of the group having a viable network connection.

Embodiments of the distributed acquisition module 165 are described in further detail below. In some embodiments, the distributed acquisition module 165 may be implemented as a hardware circuit (e.g., a controller, a custom VLSI circuit or gate array, a logic chip, integrated circuit, or the like), a programmable logic device (e.g., a field programmable gate array, a programmable array logic, programmable logic devices, or the like), executable code (e.g., software, firmware, device driver, or the like), or combinations thereof.

The input device 170, in one embodiment, may comprise any known computer input device including a touch panel, a button, a keyboard, and the like. The input device 170 is configured to receive input from a user, for example touch input, key press input, and the like. In certain embodiments, the input device 170 may include a microphone or other suitable device for receiving voice input from the user. For example, the user may speak one or more commands, wherein input device 170 receives the one or more commands as voice input.

In one embodiment, the input device 170 includes a touch-sensitive portion, such as a touch-sensitive input panel, configured to receive touch input from the user, such as an input gesture. In some embodiments, at least the touch-sensitive portion of the input device 170 may be integrated with the output device 175, for instance as a touchscreen or similar touch-sensitive display.

The output device 175, in one embodiment, may comprise any known electronic display capable of outputting visual data to a user. As used herein, the output device 175 refers to a physical, electronic display component of the computing device 150. For example, the output device 175 may be an LCD display, an LED display, an OLED display, a projector, or similar display device capable of outputting images, text, characters, and the like to a user. The output device 175 may display a user interface, such as a graphical user interface (GUI). In one embodiment, the user interface may include one or more windows.

In some embodiments, the output device 175 may be integrated with at least a portion of the input device 170. For example, the output device 175 and a touch panel of the input device 170 may be combined to form a touchscreen or similar touch-sensitive display. The output device 175 may receive data for display from the processor 155, the memory 160, and/or the distributed acquisition module 165.

The network interface 180, in one embodiment, is configured to communicate with one or more external modules, computers, data repositories, or other nodes via the mobile communication network (e.g., comprise of base unit 110 and network core 120) and/or via an ad hoc network 145. In one embodiment, one or more instructions may be transmitted and/or received at the computing device 150 via the network interface 180. In another embodiment, data may be transmitted and/or received via the network interface 180, including user data, network queries, voice data, messaging data, and the like. The network interface 180 may comprise communication hardware and/or communication software, including a main radio transceiver 185 and a secondary radio transceiver 190. In some embodiments, the network interface 180 may further comprise a tertiary radio transceiver 195.

The main radio transceiver 185, in one embodiment, is configured to communicate with the base unit 110 using a primary wireless connection 115. The main radio transceiver 185 may communicate using a first wireless protocol, such as the LTE communication standard, or similar wireless wide area network protocol. In some embodiments, the network interface 180, the distributed acquisition module 165, and/or the memory 160 may store a threshold power consumption level for the main radio transceiver 185. If the main radio transceiver 185 experiences a signal condition (e.g., a connection status) causing it to exceed the threshold power consumption level, then the distributed acquisition module 165 may form a group to conserver power, as described herein.

The secondary radio transceiver 190, in one embodiment, is configured to communicate with at least one mobile communication device 105 using a secondary wireless connection 135. The secondary radio transceiver 190 may communicate using a second wireless protocol that is different than the first wireless protocol. In one embodiment, the secondary radio transceiver 190 has a shorter range than the main radio transceiver 185. In another embodiment, the secondary radio transceiver 190 may consume less power than the main radio transceiver 185.

In certain embodiments, the network interface 180 forms an ad hoc network 145 with at least one nearby mobile communication device 105 using the secondary radio transceiver 190. In one embodiment, secondary radio transceiver 190 communicates using the IEEE 802.11 family of wireless communication standards, or other WLAN protocol. In another embodiment, the secondary radio transceiver 190 communicates using the Bluetooth standard, or similar wireless communication protocol. Accordingly, an ad hoc network 145 may use the IEEE 802.11 standard or the Bluetooth standard, as determined by the capabilities of the secondary radio transceiver 190. In other embodiments, the network interface 180 may form in ad hoc network 145 using the main radio transceiver 185.

The tertiary radio transceiver 195, in one embodiment, is configured to communicate with at least one mobile communication device 105 using a tertiary wireless connection. In one embodiment, the tertiary wireless connection uses a third wireless protocol that is different than both the first wireless protocol and a second wireless protocol. In some embodiments, the tertiary radio transceiver 195 has a shorter range than either the main radio transceiver 185 or the secondary radio transceiver 190. In further embodiments, the tertiary radio transceiver 195 may consume less power than either the main radio transceiver 185 or the secondary radio transceiver 190.

For example, in one embodiment, a mobile communication device 105 may include a main radio transceiver 185 used for LTE-based wireless communication, a secondary radio transceiver 190 used for IEEE 802.11-based wireless communication, and a tertiary radio transceiver 195 used for Bluetooth-based wireless communication. If the main radio transceiver 185 is unable to connect with the network, has a poor network connection, or otherwise experiences excessive power consumption, then the mobile communication device 105 may switch to the secondary radio transceiver 190 and form a group of the wireless communication device is also experiencing a poor/lost network connection and/or excessive power consumption, wherein the group communicates via the second wireless protocol (e.g., Wi-Fi). However, should the secondary radio transceiver 190 be unable to form a group or, alternatively, should the secondary radio transceiver 190 be overwhelmed with the number of mobile communication devices communicating using the second wireless protocol, then the mobile communication device 105 may switch to the tertiary radio transceiver 195 to form a group, wherein the group communicates using the third wireless protocol (e.g., Bluetooth).

Figure 2:
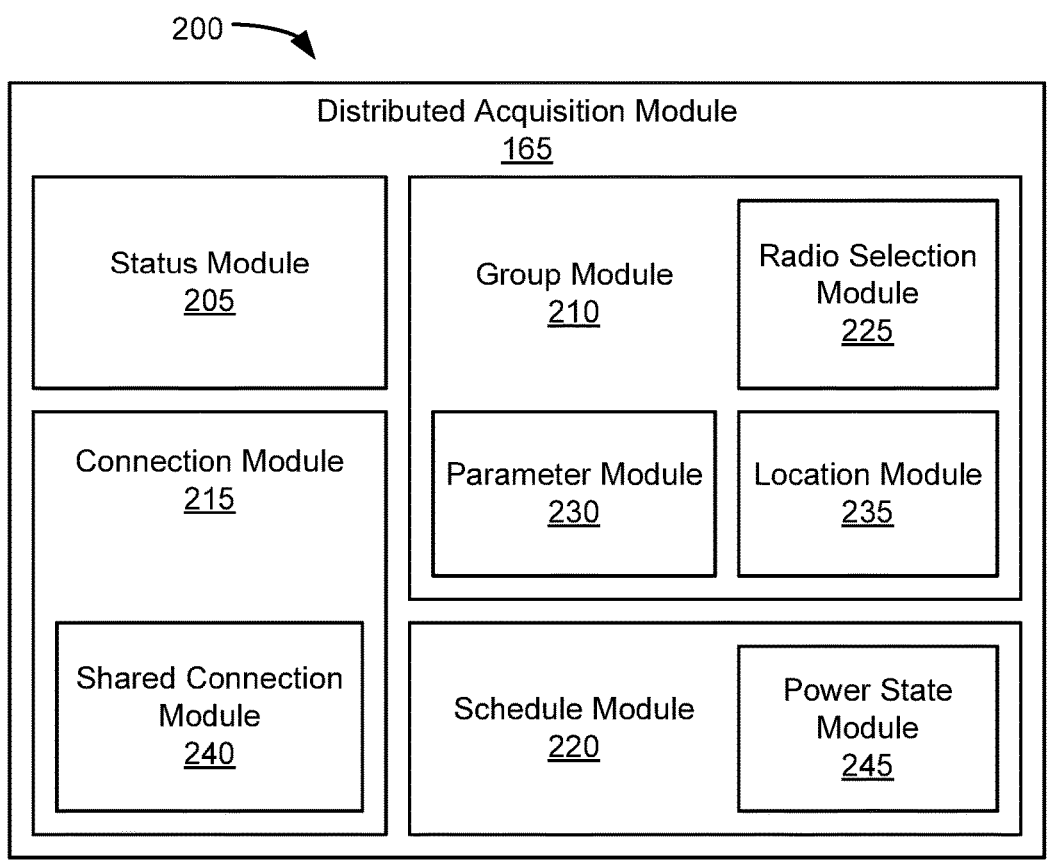
FIG. 2 is a schematic block diagram illustrating one embodiment of an apparatus for distributed network acquisition among a group of communication devices.

FIG. 2 is a schematic block diagram illustrating an apparatus 200 for distributed network acquisition among a group of communication devices, according to embodiments of the disclosure. The apparatus 200 includes a distributed acquisition module 165, which may be one embodiment of the distributed acquisition module 165 described above with reference to FIG. 1. The distributed acquisition module 165 includes a status module 205, a group module 210, and a connection module 215. As depicted, the distributed acquisition module 165 may also include one or more of: a schedule module 220, a radio selection module 225, a device parameter module 230, a device location module 235, a shared connection module 240, and a power state module 245. The modules 205-245 may be communicatively coupled to one another. The distributed acquisition module 165 may comprise hardware circuits, program code operating on a processing device, or a combination of hardware circuitry and program code.

The status module 205, in one embodiment, is configured to detect a connection status of the main radio transceiver 185. In one embodiment, the status module 205 may determine whether the connection status is one of: a lost connection state, a weak signal status, and an excessive power consumption status. In some embodiments, the connection status indicates a strength of connection (e.g., signal strength) between the base unit 110 and the communication device 105. For example, the connection status may indicate one of: a strong network signal, a weak network signal, the absence of a network signal, an unreliable network signal, a tower overload condition, and a wireless interference condition. In certain embodiments, the connection status may indicate whether the main radio transceiver 185 experiences excessive power consumption.

As used herein, "excessive power consumption" refers to power consumption beyond a threshold level. Thus, an excessive power consumption status occurs when the power consumption of the main radio transceiver 185 exceeds the threshold level, for example due to a weak or lost connection to the base unit 110. Power consumption may be expressed as an amount of power consumed per unit of time. The power consumption threshold may be an instantaneous threshold compared to instantaneous power consumption, or may be an average threshold compared to average power consumption over a window of time.

In some embodiments, the excessive power consumption status may be due to a lost connection. When the signal is lost, weak, and/or unreliable, the main radio transceiver may expend an excessive amount of power (e.g., more than the threshold amount) as it attempts to reacquire the signal or communicate over the weak/poor connection. Accordingly, the status module 205 may also detect a lost connection status of the main radio transceiver 185. As used herein, a lost connection status refers to a condition where the main radio transceiver 185 is no longer able to communicate with the base unit 110 and/or the network core 120. A lost connection is a specific instance of excessive power consumption. Examples of lost connection conditions/types include, but are not limited to, a no signal condition, a tower overload condition, an unreliable signal (e.g., resulting intermittent network connection), and the like.

In some embodiments, the status module 205 may signal the group module 210 and/or the connection module 215 in response to detecting a particular connection status. For example, the status module 205 may signal the group module 210 and/or connection module 215 in response to detecting a lost connection, a weak signal, or excessive power consumption of the main radio transceiver 185. In other embodiments, the status module 205 may store the connection status in memory 160. The status module 205 may comprise hardware circuits, program code operating on a processing device, or a combination of hardware circuitry and program code.

In some embodiments, the connection status indicates a connection type, such as a strong connection (e.g., strong signal strength), a weak signal, a wireless interference condition, or a lost connection. In further embodiments, the lost connection status may indicate a type of lost connection. Examples of lost connection types include, but are not limited to, a no signal condition, an unreliable signal with the base unit 110, a tower overload condition at a base unit 110, and the like. Additionally, the connection status may indicate excessive power consumption at the main radio transceiver 185 (e.g., due to a weak or lost signal). In one embodiment, detecting the lost connection status may include the status module 205 determining that the rate of error over the primary wireless connection 115 exceeds a threshold error rate.

In one embodiment, the status module 205 may activate a secondary radio transceiver 190 in response to detecting the certain connection statuses of the main radio transceiver 185, including, but not limited to, a weak signal status, a lost signal status, and an excessive power consumption status. For example, the main radio transceiver 185 may be a cellular network adapter and the secondary radio transceiver 190 may be a Wi-Fi adapter, wherein the status module 205 activates the Wi-Fi adapter in response to detecting a lost connection or weak signal status at the cellular network adapter.

In some embodiments, the status module 205 continues to monitor a network status after detecting a lost connection status. Accordingly, the status module 205 may detect that a viable connection status has been achieved (e.g., a connection of that is not a lost connection). In certain embodiments, the status module 205 signals the group module 210, the connection module 215, and/or at least one nearby communication device 105, in response to detecting the viable connection status. Accordingly, the host communication device 105 containing the status module 205 may report its viable connection to other communication devices 105 in the group 140.

The group module 210, in one embodiment, is configured to form a group with another communication device (e.g., another communication device 105) based on the connection status. For example, the group module 210 may search for at least one nearby communication device 105 in response to the status module 205 detecting a weak signal status, a lost connection status, and/or an excessive power consumption status. The group module 210 may search for nearby communication device also experiencing a lost connection, weak signal, or excessive power consumption status and invite them to form a group 140. As another example, the group module 210 may receive an invitation to form a group 140 with at least one nearby communication device 105 and decide whether to accept or reject the invitation. The group module 210 may comprise hardware circuits, program code operating on a processing device, or a combination of hardware circuitry and program code.

In some embodiments, the group module 210 searches for at least one nearby communication device 105 also reporting a same connection status in response to the status module 205 detecting one or more of: a lost connection status a weak signal status, and/or an excessive power consumption status for a main radio transceiver 185. As used herein, a "nearby" communication device 105 refers to a communication device 105 within a predetermined range. In one embodiment, the predetermined mange may coincide with a radio coverage range of the secondary transceiver 190 and/or the tertiary transceiver 195. In certain embodiments, a communication device 105 experiencing a lost connection status (or weak signal status) searches for nearby communication devices 105 also experiencing a lost connection (or weak signal) status. Similarly, a communication device 105 experiencing an excessive power consumption status may search for nearby communication devices 105 also experiencing an excessive power consumption status.

Searching for at least one nearby communication device 105 may include the group module 210 polling for nearby communication devices 105. In one embodiment, module 210 may use the secondary transceiver 190 and/or the tertiary transceiver 195 to poll for nearby communication devices 105. Searching for at least one nearby communication device 105 may also include receiving a response to the poll, the poll response indicating a connection status for the nearby communication device 105. In certain embodiments, the poll response may also include a location, a power state, and/or at least one device parameter of the nearby community device 105.

Based on the poll responses, the group module 210 may transmit a group invite to at least one nearby communication device 105 reporting an excessive power consumption status. The group invite may be transmitted via the secondary radio transceiver 190 and/or the tertiary radio transceiver 195. In one embodiment, the group module 210 transmits a group invite to those nearby communication devices 105 reporting the same type of connection status as detected by the status module 205.

In another embodiment, the group module 210 transmits a group invite to those nearby communication devices 105 operating on the same mobile communication network (e.g., the same network carrier) as the host communication device 105 containing the group module 210. In further embodiments, the group module 210 may transmit a group invite only to those nearby communication devices 105 matching a power state and/or at least one device parameter of the host communication device 105. For example, the group module 210 may exclude from the group 140 each nearby communication device 105 having device parameters different from those of the host communication device 105.

In some embodiments, the group module 210 may reform the group 140. In one embodiment, the group 140 may be a dynamic group where communication devices 105 may enter and leave the group 140 at any time. In another embodiment, the group 140 may automatically reform at regular intervals. Accordingly, the group module 210 may re-poll nearby communication devices 105 and/or re-invite nearby communication devices 105. In certain embodiments, the group module 210 may cause the host communication device 105 to leave the group 140 in response to the host communication device 105 achieving a viable (e.g., usable and stable) network connection and/or other nearby communication devices 105 having a viable network connections. For example, if a threshold ratio of communication devices 105 that form the group 140 achieve a viable network connection and/or no longer report excessive power consumption, then the group module 210 may dissolve the group 140.

In certain embodiments, the group module 210 may receive a group invite from a nearby communication device 105. The group invite may be received via the secondary radio transceiver 190 and/or the tertiary radio transceiver 195. Similarly, the group module 210 may receive a poll from a nearby communication device 105. The poll may be a ping, or other signal soliciting a response. The group module 210 may further transmit a poll response back to the nearby communication device 105. In one embodiment, the nearby communication device 105 transmits a group invite responsive to receiving the poll response.

In one embodiment, the group invite may include device parameters, a power status, an excessive power consumption type and/or lost connection type, or other information regarding the inviting communication device 105. The group module 210 may compare the information included in the group invite to corresponding attributes of the communication device 105 containing the group module 210 in order to determine whether to accept or reject (e.g., ignore) the group invite. For example, the group module 210 may transmit an invite response accepting the group invite only if the inviting communication device 105 operates on the same network carrier and/or has similar device parameters (device class, antenna type, etc.) as the invited communication device 105. Upon accepting the group invite, the invited communication device 105 becomes part of the group 140. The poll, poll response, group invite, and invite response may be referred to herein as "group formation" messages.

In some embodiments, the group module 210 selects a radio transceiver to be used in forming the group 140. In certain embodiments, the group module 210 may invite (or alternatively accept an invite from) a nearby communication device 105 based on device parameters and/or device location. The group module 210 may include a radio selection module 225, a device parameter module 230, and/or a device location module 235, as discussed in greater detail below.

In some embodiments, the group module 210 may include a radio selection module 225 that selects a radio transceiver for forming the group 140. The radio selection module 225, in one embodiment, may select a radio transceiver based on battery level, based on a number of users currently using radio spectrum, based on detected interference, and the like.

In some embodiments, the radio selection module 225 may select a radio transceiver based on an available amount of battery power at the mobile communication device 105. For example, the secondary radio transceiver 190 may consume more power than the tertiary radio transceiver 195. In order to maximize battery life, the radio selection module 225 may select a radio transceiver that consumes less power. In one embodiment, the radio selection module 225 only considers the amount of available battery power and selecting the radio transceiver when the available amount of battery power is below a threshold amount. In other embodiments, the radio selection module 225 may automatically select a radio transceiver based on an available amount of battery power whenever a weak or lost signal is experienced while on battery power.

In one embodiment, the radio selection module 225 detects an overload condition of the secondary radio transceiver 190. In one embodiment, the overload condition is due to an excess of users using the secondary wireless connection 135. For example, users may have difficulty accessing a cellular network (e.g., using the primary wireless connection 115) at a stadium or sporting arena due to the number of mobile communication devices 105 and close proximity to one another.

Further, in the crowded circumstances more than one thousand users may be within radio coverage range of ad hoc Wi-Fi. Accordingly, the radio selection module 225 may detect an overload condition of the Wi-Fi transceiver due to the number of nearby communication devices exceeding a threshold number (e.g., a threshold of twenty or fifty). The radio selection module 225 may then select the tertiary radio transceiver 195 (e.g., Bluetooth) for forming the group 140, where the tertiary radio transceiver 195 has a smaller coverage area than the secondary radio transceiver 190.

Alternatively, the radio selection module 225 may initially select the tertiary radio transceiver 195 as this may have the smallest power consumption (potentially maximizing battery savings). However, if a number of nearby communication devices 105 in a group 140 formed using the tertiary radio transceiver 195 is below a threshold value (e.g., a threshold of five or ten), then the radio selection module 225 may activate the secondary radio transceiver 190 and determine whether a larger group 140 may be formed using the secondary radio transceiver 190. Further, the radio selection module 225 may estimate a power cost of group network acquisition using the secondary radio transceiver 190 and using the tertiary radio transceiver (e.g., factoring in group size, transmit/receive power costs, processing overhead costs, etc.), and select the radio transceiver with the smallest estimated power cost.

In another embodiment, the radio selection module 225 may detect an interference condition of a radio transceiver, wherein the radio selection module 225 selects a radio transceiver that would be unaffected by the interference condition. For example, a level of interference over Wi-Fi channels (used by the secondary radio transceiver 190) may be above and which threshold due to a large number of mobile communication devices 105 attempted to communicate over the Wi-Fi channels in close proximity to one another.

Here, the radio selection module 225 may select either the main radio transceiver 185 or the tertiary radio transceiver 195 for forming the group 140. In one embodiment, the radio selection module 225 may select the main radio transceiver 185 for forming an ad hoc network 145 using operating frequencies of the main radio transceiver 185 (e.g., cellular network frequencies). In another embodiment, the radio selection module 225 may select the tertiary radio transceiver 195 for forming an ad hoc network 145 using different channels and/or channel hopping schemes than those experiencing interference at the second radio transceiver.

The radio selection module 225 may comprise hardware circuits, program code operating on a processing device, or a combination of hardware circuitry and program code. As depicted, the radio selection module 225 may be a component of the group module 210. For example, the radio selection module 225 may be a hardware component of the group module 210. As another example, the radio selection module 225 may be a subroutine of the group module 210. However, in other embodiments the radio selection module 225 may be an independent component communicatively coupled to the group module 210.

In some embodiments, the group module 210 may include a device parameter module 230 that identifies device parameters for each nearby communication device 105. The device parameters may include, but are not limited to, an antenna size, a device class (cell phone vs tablet computer vs laptop computer), and an ability to share a network connection with another communication device 105. The device parameter may further indicate a network operator/carrier (e.g., of the primary wireless connection 115), an identifier of the base unit 110 with which the communication device 105 is (attempting to) communicate, an operating radio frequency of the main radio transceiver 185, and/or a type of network connection (e.g., data coverage and/or cellular/voice coverage). The device parameter module 230, in one embodiment, may query each nearby communication device 105 for its device parameters. In another embodiment, the device location module 235 parses group formation messages for device parameters relating to each communication device 105 in the group 140.

The device parameter module 230 provides the device parameter data to the group module 210, wherein the group module 210 forms the group 140 based on the provided data. Additionally, the device parameter module 230 may identify device parameters for the host communication device 105. Thereafter, the device parameter module 230 may compare the device parameters of nearby mobile communication devices 105 with those of the host communication device 105 and provide the comparison to the group module 210. In certain embodiments, the group module 210 may form a group only with nearby mobile communication devices 105 that operate on the same network carrier, have similar antenna specifications, and are the same device class as the host communication device 105 containing the device parameter module 230.

For example, the group module 210 may form the group 140 with only mobile communication devices 105 that are the same device class (smartphone, a tablet computer, laptop, etc.). As another example, the group module 210 may form the group 140 only with mobile communication devices 105 have similar antenna specifications. In a further example, the group module 210 may form a group 140 with only mobile communication devices 105 that operate on the same network carrier and/or over the same radio frequencies. Thus, the group module 210 may exclude certain devices based on its device parameters so as to form a group of mobile communication devices facing similar network connection challenges due to similar hardware and/or network carriers.

The device parameter module 230 may comprise hardware circuits, program code operating on a processing device, or a combination of hardware circuitry and program code. As depicted, the device parameter module 230 may be a component of the group module 210. For example, the device parameter module 230 may be a hardware component of the group module 210. As another example, the device parameter module 230 may be a subroutine of the group module 210. However, in other embodiments the device parameter module 230 may be an independent component communicatively coupled to the group module 210.

In some embodiments, the group module 210 may include a device location module 235 that identifies a location of each nearby communication device 105. In one embodiment, the location is a geographic position, such as coordinates derived from a satellite positioning system. In another embodiment, the location indicates whether the communication device 105 is indoors or outdoors. In a further embodiment, the location may indicate how near to the building perimeter an indoor communication device 105 is located.

In certain embodiments, the device location module 235 queries each communication device 105 in the group 140 for location data. In another embodiment, the device location module 235 parses group formation messages for location data relating to each communication device 105 in the group 140. In certain embodiments, the device location module 235 may further identify a speed, velocity, or other movement measurement of each communication device 105.

The device location module 235 provides the location and/or movement data to the group module 210, wherein the group module 210 forms the group 140 based on the provided data. In a further, the device location module 235 may compare the location and/or movement data of nearby mobile communication devices 105 with those of the mobile communication device 105 containing the device location module 235 and provide the comparison to the group module 210. In certain embodiments, the group module 210 may form a group only with nearby mobile communication devices 105 that operate on the same network carrier, have similar location and/or movement characteristics as the mobile communication device 105 containing the device location module 235.

For example, the group module 210 may form the group 140 with only mobile communication devices 105 that are indoors (or only with those that are outdoors). In another example, the group module 210 may form a group 140 with only mobile communication devices 105 that are near the perimeter of the building. The group module 210 may exclude certain devices based on location and/or movement so as to form a group of mobile communication devices facing similar network connection challenges (e.g., lost or weak signal) due to similar location/geography.

Thus, in an office space, communication devices 105 near the center of the building, which naturally receive less signal, may be excluded from a group 140 of communication devices 105 near an outer wall of the building. Similarly, communication devices 105 near the center the building may exclude a communication device 105 near an outer wall of the building. In this way, communication devices near windows, which naturally receive greater signal, will not report strong signals that cannot be received by the communication devices 105 further towards the building interior.

The device location module 235 may comprise hardware circuits, program code operating on a processing device, or a combination of hardware circuitry and program code. As depicted, the device location module 235 may be a component of the group module 210. For example, the device location module 235 may be a hardware component of the group module 210. As another example, the device location module 235 may be a subroutine of the group module 210. However, in other embodiments the device location module 235 may be an independent component communicatively coupled to the group module 210.

The connection module 215, in one embodiment, attempts network acquisition for the group during an assigned connection period. The connection module 215 also ceases network acquisition attempts during an unassigned connection period. As used herein, "network acquisition" refers to a mobile communication device 105 acquiring a network connection to the base unit 110 and/or network core 120. In lost connection scenarios, "network acquisition" includes searching for a base unit 110 in radio range of the main radio transceiver 185, and other network polling activities. In weak signal scenarios, "network acquisition" includes establishing a connection and communicating with the base unit 110 and/or network core 120.

As used herein, a "connection period" refers to a time period during which an assigned communication device 105 attempts to access/connect to the mobile communication network comprising the base unit 110 and the network core 120. The connection period may also refer to a time period during which the assigned communication device 105 accesses the network on behalf of the group (e.g., routes group traffic over its connection). The connection period may be a reoccurring event. For example, a communication device 105 may be assigned one connection period every minute. The connection module 215 may comprise hardware circuits, program code operating on a processing device, or a combination of hardware circuitry and program code.

In some embodiments, the connection module 215 deactivates the main radio transceiver 185 during an unassigned connection periods. For example, the main radio transceiver 185 may power down after an assigned connection period and may power up again immediately before the next assigned connection period. In other embodiments, the main radio transceiver 185 remains active during an unassigned connection periods (e.g., to listen for downlink traffic addressed to the communication device 105), but does not transmit or perform network connection functions during the unassigned connection periods. Network connection functions (also referred to as network polling duties) include, but are not limited to, searching for the base unit 110, listening for system information broadcast by the base unit 110, attempting to connect with the packet core 120, and the like.

The connection module 215 attempts network acquisition according to a network connection schedule. In one embodiment, the connection module 215 receives a network connection schedule from the schedule module 220. In other embodiments, the connection module 215 receives a network connection schedule from another communication device 105 in the group 140.

In a lost connection status scenario (e.g., where no signal is present), the connection module 215 continues attempting network acquisition during the assigned connection period and resting during the unassigned connection periods until it either connects with the mobile communication network (e.g., the base unit 110 and/or the packet core 120) during the assigned connection period or, alternatively, receives a report of a viable network connection from another communication device 105 in the group 140. In a weak signal status scenario, the connection module 215 establishes a connection with and communicates over the mobile communication network on behalf of the group 140 during the assigned connection period and does not transmit over the primary radio transceiver 185 during the unassigned connection periods.

In some embodiments, the connection module 215 may include a shared connection module 240 which allows another communication device 105 to share (e.g., piggyback) an established network connection. Accordingly, the shared connection module 240 may accept traffic from another communication device 105 and communicate the receive traffic (voice, data, and combinations thereof) over the primary wireless connection 115. Additionally, the shared connection module may forward responses received over the primary wireless connection 15 and intended for the other communication device 105. Further, the shared connection module 240 may request that a communication device 105 having a viable connection to the mobile communication network (e.g., base unit 110 and network core 120) share its connection and pass data to the communication device 105 having the viable connection.

In some embodiments, the shared connection module 240 identifies requests from other communication devices 105 in the group 140 to share a viable connection at the communication device 105 containing the shared connection module 240. As used herein, a "viable connection" refers to a wireless connection 115 with the base unit 110 and network core 120 over which the communication device 105 is able to communicate data, voice, and other network traffic. A viable connection is not a lost connection, but may be a weak signal or experiencing wireless interference, so long as the communication device 105 is able to communicate data, voice, and other network traffic.

In one embodiment, the shared connection module 240 accepts a request from at least one communication device 105 in the group 140 to share the viable connection at the communication device 105 containing the shared connection module 240 (also referred to as the "host" communication device). The host communication device 105 may receive traffic from the other communication devices 105 in the group 140 via the secondary radio transceiver 190 and/or the tertiary radio transceiver 195. The host communication device 105 acts as a router, forwarding traffic from the other communication devices 105 to the mobile communication network. In one embodiment, the host communication device also forwards responses from the mobile communication network back to the communication devices 105. In another embodiment, the non-host communication devices 105 listen for downlink traffic from the base unit 110. The shared connection module 240 may perform network scheduling activities to allocate resources (e.g., connection period on the primary wireless connection 115) among the host communication device 105 and the other communication devices 105 that share the viable connection of the host communication device 105.

In a further embodiment, the shared connection module 240 tracks usage by each of the communication devices 105. In certain embodiments the shared connection module 240 may indicate to the network core 120 when it is performing activities on behalf of other communication devices 105 and may further identify those other communication devices 105 so that billing charges may be assessed to the other communication devices 105.

In some embodiments, the shared connection 240 determines whether to accept a request of another communication device 105 (e.g., a petitioning communication device 105) to share the viable connection at the host communication device 105. In one embodiment, the shared connection module 240 may decide whether to accept a request based on one or more factors including, but not limited to, power levels of the host communication device and of the petitioning communication device 105, proximity of the petitioning communication device 105 to the host communication device 105, the amount and/or nature of data to be transmitted on behalf of the petitioning communication device 105, and the like.

In certain embodiments, the shared connection module 240 identifies one or more other communication devices 105 in the group 140 that likewise have a viable connection. The shared connection module 240 may coordinate with the other communication devices 105 so that each communication device 105 with a viable connection takes a turn sharing its viable connection with the group 140 (e.g., take turns being the host communication device 105). A first host communication device 105 may share its viable connection for specific amount of time, or until a certain amount of power is consumed, after which another communication device 105 becomes the host communication device 105. Hosting duties may be scheduled using a round-robin approach, credit- or token-based scheduling, fair queuing, or using another scheduling approach. In some embodiments, two or more communication devices 105 with viable connection may simultaneously act as hosts for other communication devices 105 in the group 140.

The shared connection module 240 may comprise hardware circuits, program code operating on a processing device, or a combination of hardware circuitry and program code. As depicted, shared connection module 240 may be a component of the connection module 215. For example, the shared connection module 240 may be a hardware component of the connection module 215. As another example, the shared connection module 240 may be a subroutine of the connection module 215. However, in other embodiments the shared connection module 240 may be an independent component communicatively coupled to the connection module 215.

The schedule module 220, in one embodiment, is configured to negotiate a network connection schedule for the group 140 of mobile communication devices 105. As used herein, a "network connection schedule" refers to a schedule assigning each communication device 105 in the group 140 with a connection period. During a connection period, a scheduled communication device 105 performs network polling duties such as searching for base unit 110, listening for broadcast system information, attempting to connect with the packet core 120, and the like. The communication devices 105 do not perform network polling duties until they are scheduled. Thus unassigned communication devices 105 cease network acquisition attempts during an assigned connection period. In certain embodiments, the network connection schedule may assign connection periods that overlap by a small amount to allow the next communication device 105 to establish a network connection before the previous communication device 105 ceases network acquisition, thus providing a continuous network connection for the group 140.

The schedule module 220 may negotiate a network connection schedule each time the group module 210 forms a group 140 of nearby communication devices 105. Accordingly, if the group module 210 reforms the group 140 (e.g., due to adding new communication devices 105 and/or removing communication devices 105), then the schedule module 220 may renegotiate the network connection schedule based on the reformed group 140. The schedule module 220 may form the group 140 using head-less (e.g., leader-less) negotiation techniques.

In certain embodiments, the schedule module 220 schedules connection periods of equal length. In other embodiments, the schedule module 220 schedules connection periods of unequal length. The schedule module 220 may assign a particular communication device 105 a connection period of greater length due to the communication device 105 having a greater battery life, having a better antenna structure, and/or experiencing less interference than other communication devices 105 in the group 140. In one embodiment, the schedule module 220 assigns each communication device 105 in the group 140 a weight based on battery life, antenna structure, experienced interference, device class, or other device parameters. The schedule module 220 may then assign a weighted amount connection period based on the communication devices weight.

The schedule module 220 may schedule connection periods using a fair queuing technique. Examples of fair queuing techniques include, but are not limited to, weighted fair queuing, weighted round-robin, deficit round-robin, and round-robin. In other embodiments, the schedule module 220 may schedule connection periods using a token- or credit-based technique. The goal of the schedule module 220 is to balance the load of network acquisition across the several devices forming the group 140, rather than each device attempting network acquisition individually, thereby reducing power consumption at each device in the group 140.

In some embodiments, the schedule module 220 allocates a size of the connection period based on the power state of each device in the group 140 of mobile communication devices 105. For example, a device connected to an AC power adapter may be scheduled larger connection periods than a device running off of battery power. Accordingly, the schedule module 220 may include a power state module 245 which identifies a power state for each device in the group 140. The schedule module 220 may allocate a weighted size connection period based on the amount of power available to each device in the group 140. For example, a first mobile communication device 105 with 80% battery life may be assigned a longer connection period than a second mobile communicatively should device 105 with 40% battery life.

As used herein, the power state refers to an amount of power available to a communication device 105. In one embodiment, the power state may indicate whether the communication device 105 is running on internal power (e.g., battery power) or if it is connected to an external source (e.g., AC power adapter or the like). In another embodiment, the power state may indicate an amount of power remaining in the internal power source. The amount of power remaining may be expressed as a percentage of full capacity (e.g., 80% percent battery life), an amount of watt-hours or amp-hours (e.g., 1850 mAh remaining), or an estimated amount of time (e.g., 3:21 hours remaining).

In some embodiments, the power state module 245 receives the power state for each communication device 105 in the group. For example, power state module 245 may query each communication device 105 in the group and listen for a response. As another example, each communication device 105 may indicate its power state in at least one message used to form the group, the power state module 245 parses the messages received from each communication device 105 to identify the power state for each communication device 105 in the group. The power state module 245 may indicate the power state of each communication device 105 to the schedule module 220, for example by sending a message to the schedule module 220 or by storing the power state and a location in memory 160 accessible by the schedule module 220.

The power state module 245 may comprise hardware circuits, program code operating on a processing device, or a combination of hardware circuitry and program code. As depicted, power state module 245 may be a component of the schedule module 220. For example, the power state module 245 may be a hardware component of the schedule module 220. As another example, the power state module 245 may be a subroutine of the connection module 215. However, in other embodiments the power state module 245 may be an independent component communicatively coupled to the schedule module 220.

Upon receiving the power state from the power state module 245, the schedule module 220 may assign a connection period to each communication device 105 with a length based on an amount of power available to that communication device 105. Accordingly, a first communication device 105 with a greater amount of power remaining may be assigned a larger connection period than a second communication device 105 with a smaller amount of power remaining. In one embodiment, the schedule module 220 assigns connection period sizes such that each communication device 105 will run out of power at approximately the same time. In another embodiment, the schedule module 220 may assign connection period sizes such that each communication device 105 contributes an equal percentage of its battery capacity (after a predetermined amount of time) to network acquisition duties on behalf of the group.

In some embodiments, the schedule module 220 may schedule a communication device 105 with a first size of connection period until a cutoff threshold is reached. For example, a first communication device 105 having 80% battery life on signals lost may be scheduled a greater amount of connection period than a second communication device 105 having 50% battery life until the first communication device 105 itself reaches 40% battery life. After which, the first communication device 105 may be scheduled with a smaller size of connection period than before.

In further embodiments, the schedule module 220 may exempt a communication device 105 from network acquisition duties on behalf of the group (e.g., the schedule module 220 does not schedule the communication device 105 any connection periods) in response to that communication device 105 having an amount of remaining power below a cutoff threshold. The cutoff threshold may be based on the total amount of power available to the group 140 (e.g., the sum of remaining power at each communication device 105 that forms the group 140). Alternatively, the cut off a threshold may be user defined and/or negotiated by the group 140. In one embodiment, the schedule module 220 may exclude from the group 140 any mobile communication device 105 having less than a minimum amount of power remaining.

Figure 3A:
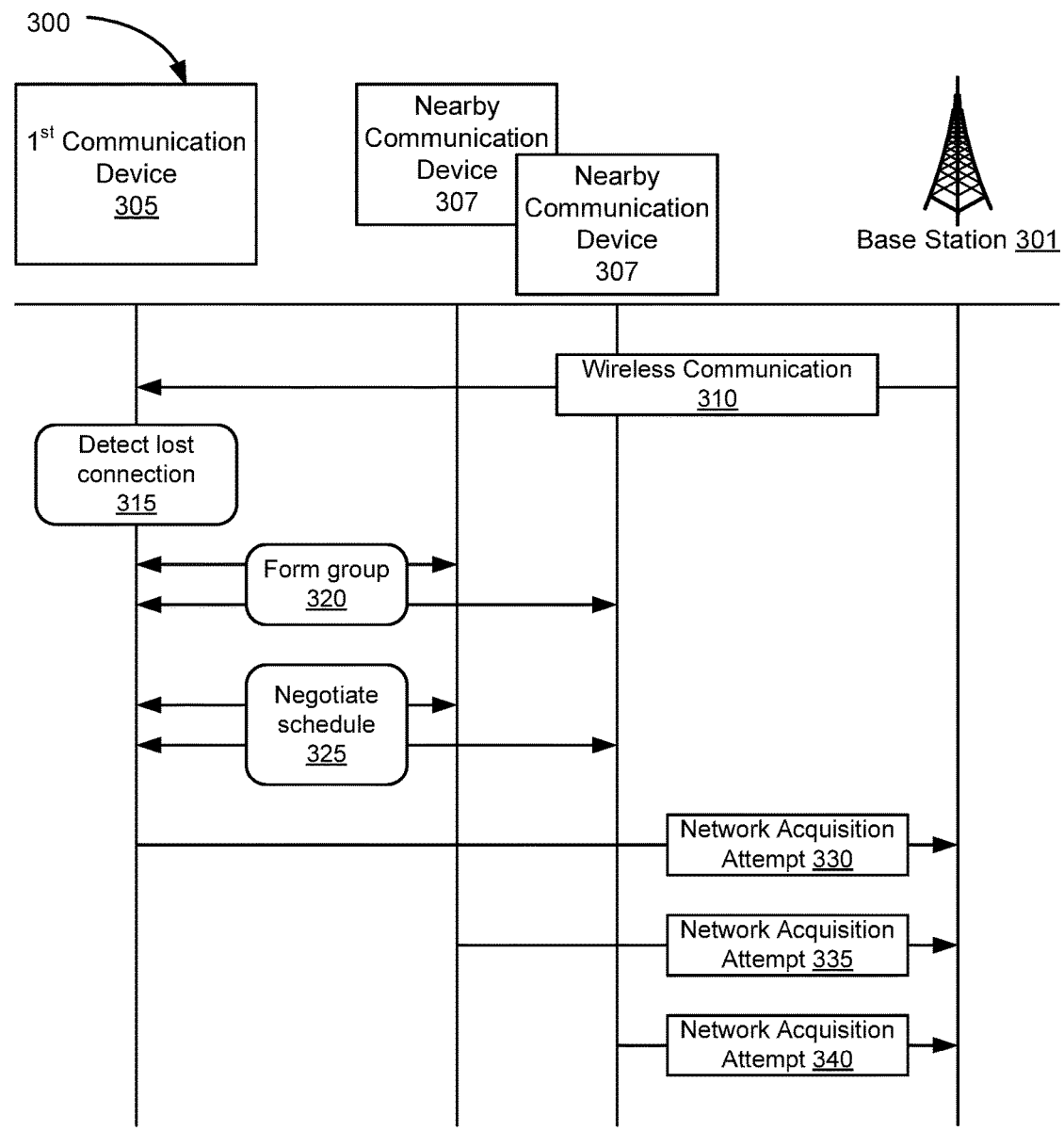
FIG. 3A is a diagram illustrating one embodiment of distributed network acquisition among a group of communication devices.
Figure 3B:
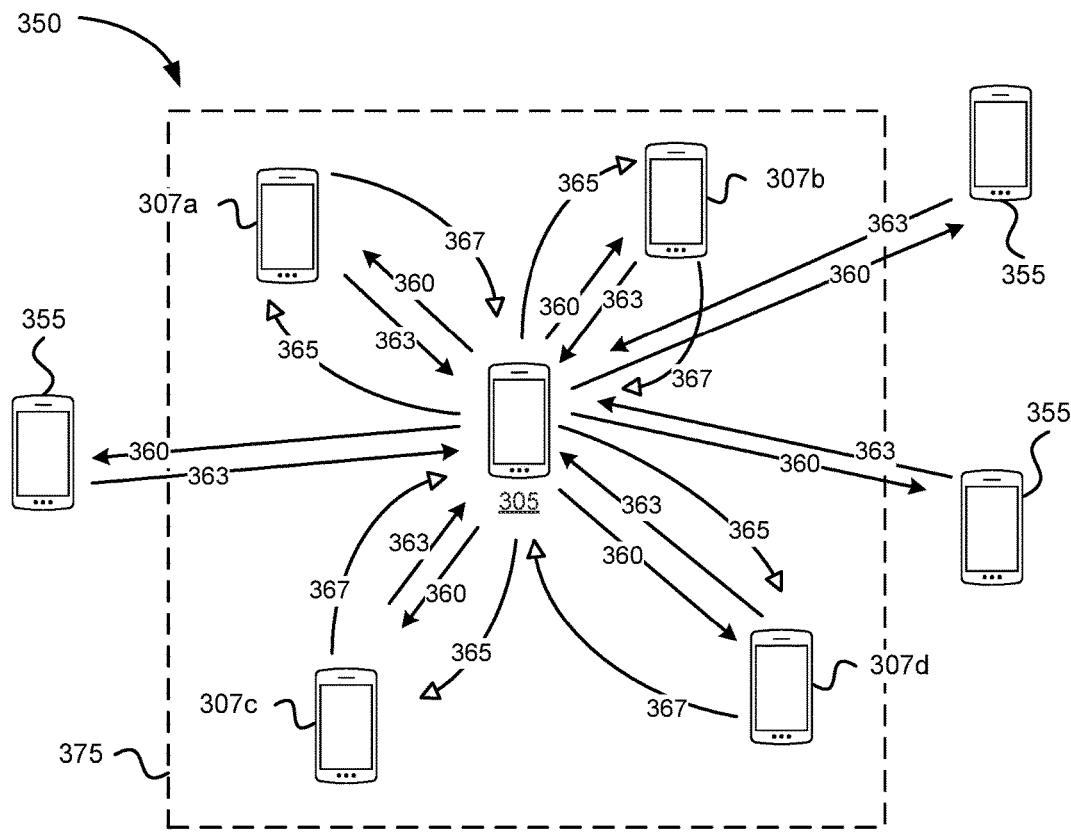
FIG. 3B is a block diagram illustrating one embodiment of group formation for distributed network acquisition.
Figure 3C:
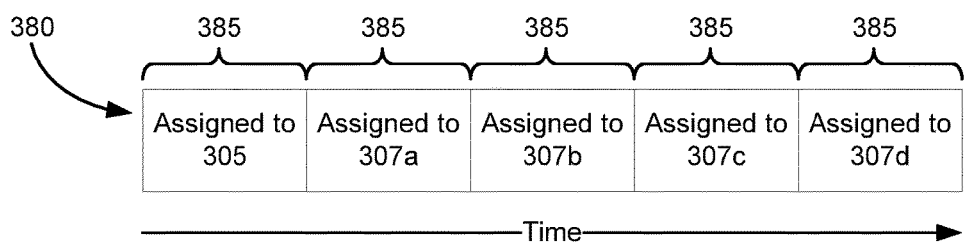
FIG. 3C is a diagram illustrating one embodiment of a network connection schedule used in distributed network acquisition among a group of communication devices.

FIGS. 3A-3C are diagrams illustrating distributed network acquisition among a group of communication devices, according to embodiments of the disclosure. FIG. 3A illustrates actions by and communications between a base station 301, a first communication device 305, and at least two nearby communication devices 307. While FIG. 3A shows two nearby communication devices 307, other embodiments may include any number of nearby communication devices 307. The base station 301 may be one embodiment of a base unit 110 as described above. The first communication device 305 and the nearby communication devices 307, may each be an embodiment of a communication device 105 described above. Specifically, each of the communication devices 305, 307 may include a distributed acquisition module 165 (not shown).

As depicted, the first communication device 305 may communicate with the base station 301 (block 310). The connection between the first communication device 305 and the base station 301 may be a viable, wireless network connection. However, at some point, the first communication device 305 loses connection with the base station 301 (block 315). The lost connection may be due to no wireless signal (e.g., a signal strength below a threshold), an unreliable wireless signal, an overload condition of the base station 301, or excessive wireless interference.

In response to losing the connection to the base station 301, the first communication device 305 forms a group with the nearby communication devices 307 (block 320). In one embodiment, the first communication device 305 activates a secondary wireless transceiver 190 in order to form the group. In some embodiments, the first communication device 305 polls the nearby communication devices 307 and transmits a group invite to at least one nearby communication device 307 based on the poll responses, as described above. In other embodiments, the first communication device 305 receives a poll and/or a group invite from a nearby communication device 307 and response to the poll/invite, thereby forming the group.

After forming the group, the first communication device 305 and the nearby communication devices 307 that form the group negotiate a network connection schedule (block 325). An example network connection schedule is depicted in FIG. 3C. As discussed above, the network connection schedule may include allocations of equal-length connection periods. Alternatively, the network connection schedule may include allocations of unequal-length connection periods based on battery life, antenna characteristics, or other device parameters of the communication devices 305, 307.

Thereafter, the communication devices 305, 307 take turns performing network acquisition duties. The first communication device 305 may attempt network acquisition during an assigned connection period (block 330) and the nearby communication devices 307 may rest (e.g., cease network acquisition attempts) during the connection period assigned to the first communication device 305. Afterwards, each of the nearby communication devices 307 may take a turn performing network polling duties (blocks 335 and 340). While one nearby communication device 307 attempts network acquisition during its assigned connection period, the other communication devices in the group will rest (e.g., cease network acquisition attempts) during their unassigned connection periods.

While FIG. 3A discusses group formation in context of a lost signal status, the disclosure is not limited to such. In other embodiments, the first communication device 305 may form a group in response to a weak signal status, an excessive power consumption status of the main radio transceiver, or the like.

FIG. 3B is a block diagram depicting group formation for distributed network acquisition, according to embodiments of the disclosure. FIG. 3B shows geographically distributed communication devices, including the first communication device 305, four nearby communication devices 307 (here labeled 307a-307d), and a plurality of additional communication devices 355. The four nearby communication devices 307 include a first nearby communication device 307a, a second nearby communication device 307b, a third nearby communication device 307c, and a fourth nearby communication device 307d. The communication devices 305, 207a-307d, and 355 may each be an embodiment of a communication device 105, described above with reference to FIGS. 1 and 2.

The first communication device 305 transmits plurality of polls 360 seeking for nearby communication devices. The first communication device 305 receives plurality of polling responses 363 in turn. In some embodiments, only communication devices 307, 355 also experiencing the same connection status as the first communication device 305 respond to the poll 360. The polling responses 363 may include characteristics of the responding communication device including location, device parameters, network carrier, a type of lost connection, and the like.

The first communication device 305 compares data in the polling responses 3652 corresponding characteristics of the first communication device (e.g., comparing location, device parameters, network carrier, connection type, etc.). The first communication device 305 may then transmit a group invite 365 and receive an invite response 367 either accepting or declining the group invite. Here the first communication device only sends group invites to the nearby communication devices 307a-307d, due to these communication devices proximity to the first communication device 305. While the depicted example shows location as a determining factor in selecting the group, in other embodiments additional factors such as device parameters, network carrier, connection type, etc. may be used to determine which communication devices are sent a group invite.

The first communication device 305 and those communication devices accepting the group invite (here each of the nearby communication devices 307a-307d) then form a group 375. Upon group formation, the communication devices 305 and 307a-307d then negotiate a network connection schedule, as discussed above. After forming the network connection schedule, each communication device 305 and 307a-307d attempt network acquisition during its assigned connection period and rests during unassigned connection periods.

FIG. 3C is a diagram depicting a network connection schedule 380 for distributed network acquisition among a group of communication devices, according to embodiments of the disclosure. The network connection schedule 380 includes a plurality of connection periods 381. Each connection period 385 is assigned to a communication device of the group 375. Here, the first communication device 305 is assigned a first connection period 385, the first nearby communication device 307a is assigned a second connection period 385, the second nearby communication device 307b is assigned a third connection period 385, the third nearby communication device 307c is assigned a fourth connection period 385, and the fourth nearby communication device 307d is assigned a fifth connection period 385. The network connection schedule 380 is cyclic in nature. Therefore, after the fourth nearby communication device 307 finishes network polling duties during its assigned connection period, the first communication device 305 again takes a turn performing network polling duties. In certain embodiments, the connection periods 385 may overlap by a small amount to allow a next scheduled communication device to establish a connection before a currently scheduled communication device ceases network acquisition, thus providing a continuous connection for the group 375.

Figure 4:
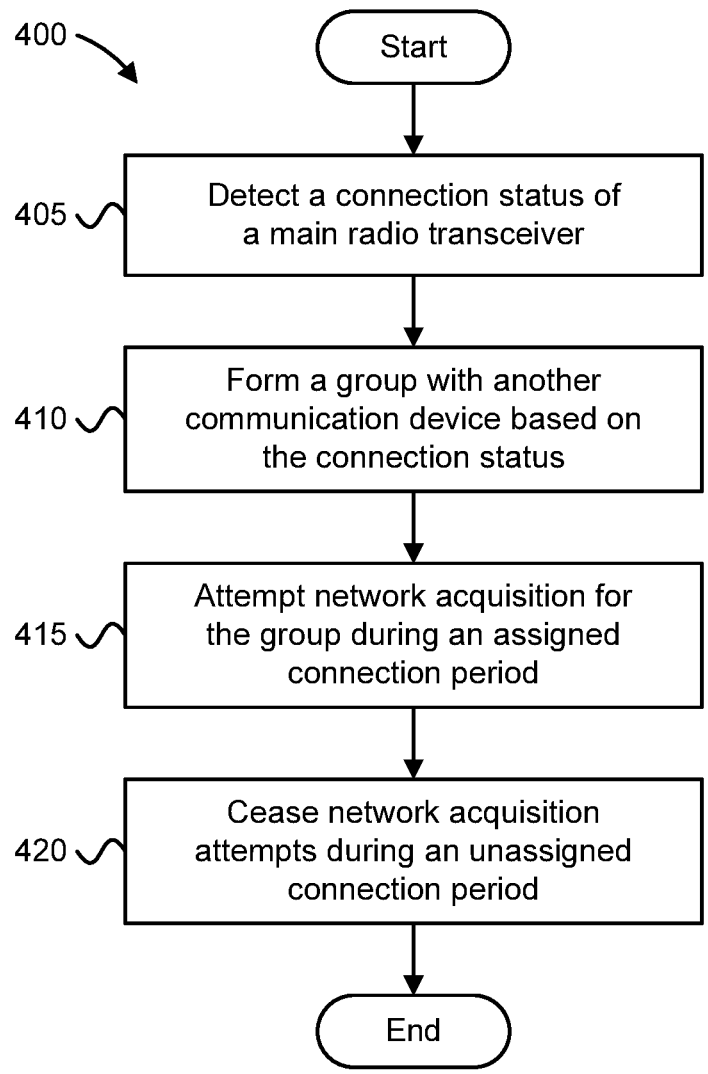
FIG. 4 is a schematic flow chart diagram illustrating one embodiment of a method for distributed network acquisition among a group of communication devices.

FIG. 4 is a schematic flow chart diagram illustrating a method 400 for distributed network acquisition among a group of communication devices. In one embodiment, the method 400 is performed by the computing device 150. In another embodiment, the method 400 may be performed by the apparatus 200. Alternatively, the method 400 may be performed by a processor 155 and a computer readable storage medium, such as the memory 160. The computer readable storage medium may store code that is executed on the processor 155 to perform the functions of the method 400.

The method 400 begins and detects 405 a connection status for a main radio transceiver of a communication device. In one embodiment, the status module 205 detects 405 a connection status for a main radio transceiver 185. In certain embodiments, the connection status may be a strong signal, the absence of a network signal, a weak network signal, an unreliable network signal, a tower overload condition, a wireless interference condition, and/or an excessive power consumption status. In some embodiments, the connection status may indicate a particular base station and/or mobile communication network.

The method 400 forms 410 a group with another communication device based on the connection status. In one embodiment, the group module 210 forms 410 a group with another communication device based on the connection status. In certain embodiments, forming 410 the group based on the connection status includes forming the group in response to detecting 405 a connection status from the group of: a lost connection state, a weak signal status, and an excessive power consumption status. In some embodiments, forming 410 the group includes activating a secondary radio transceiver and forming 410 the group using the secondary radio transceiver. For example, the secondary radio transceiver may be used to send and/or receive messages to form 410 the group.

In some embodiments, forming 410 a group with another communication device includes polling for nearby communication devices and receiving a response from at least one nearby communication device. In one embodiment, a polling response includes a connection status for the responding communication device. In such embodiments, forming 410 the group may include transmitting a group invite to each nearby communication device reporting a particular connection status. For example, forming 410 the group may include transmitting a group invite to each nearby communication device reporting the same connection status as experienced by the main radio transceiver.

In some embodiments, forming 410 the group includes identifying device parameters for the host communication device (e.g., the communication device containing the main radio transceiver). Additionally, a polling response may include device parameters for the responding communication device. In such embodiments, forming 410 the group may include excluding each nearby communication device having device parameters different from the host communication device. Examples of device parameters include, but are not limited to, a class of device, an antenna size/type, and a mobile network provider.

In certain embodiments, forming 410 the group may include receiving a group invite from a nearby communication device. In one embodiment, the group invite may include a connection status, a location, and/or device parameters of the inviting communication device. In such embodiments, the invited communication device may compare the connection status, location, and/or device parameters and accept the group invite in response to the connection status, location, and/or device parameters matching those of the invited communication device.

The method 400 attempts 415 network connection during an assigned connection period. In one embodiment, the connection module 215 attempts 415 to establish a network connection during an assigned connection period. In some embodiments, attempting 415 network connection during the assigned connection period includes polling the network, searching for a base unit, listening for system information broadcast by the base unit, attempting to connect with a packet core, pinging an application server, and the like. In certain embodiments, attempting 415 network connection includes reporting to the group whether the network acquisition attempt is successful and/or updating a network connection status.

The method 400 ceases 420 network acquisition attempts during an unassigned connection period and the method 400 ends. In one embodiment, the connection module 215 ceases 420 network acquisition attempts during an unassigned connection period. In some embodiments, ceasing 420 network acquisition attempts during the unassigned connection period includes switching off the main radio transceiver. In certain embodiments, ceasing 420 network acquisition attempts during the unassigned connection period includes listening for network connection reports from the group and/or network connection status updates.

Figure 5:
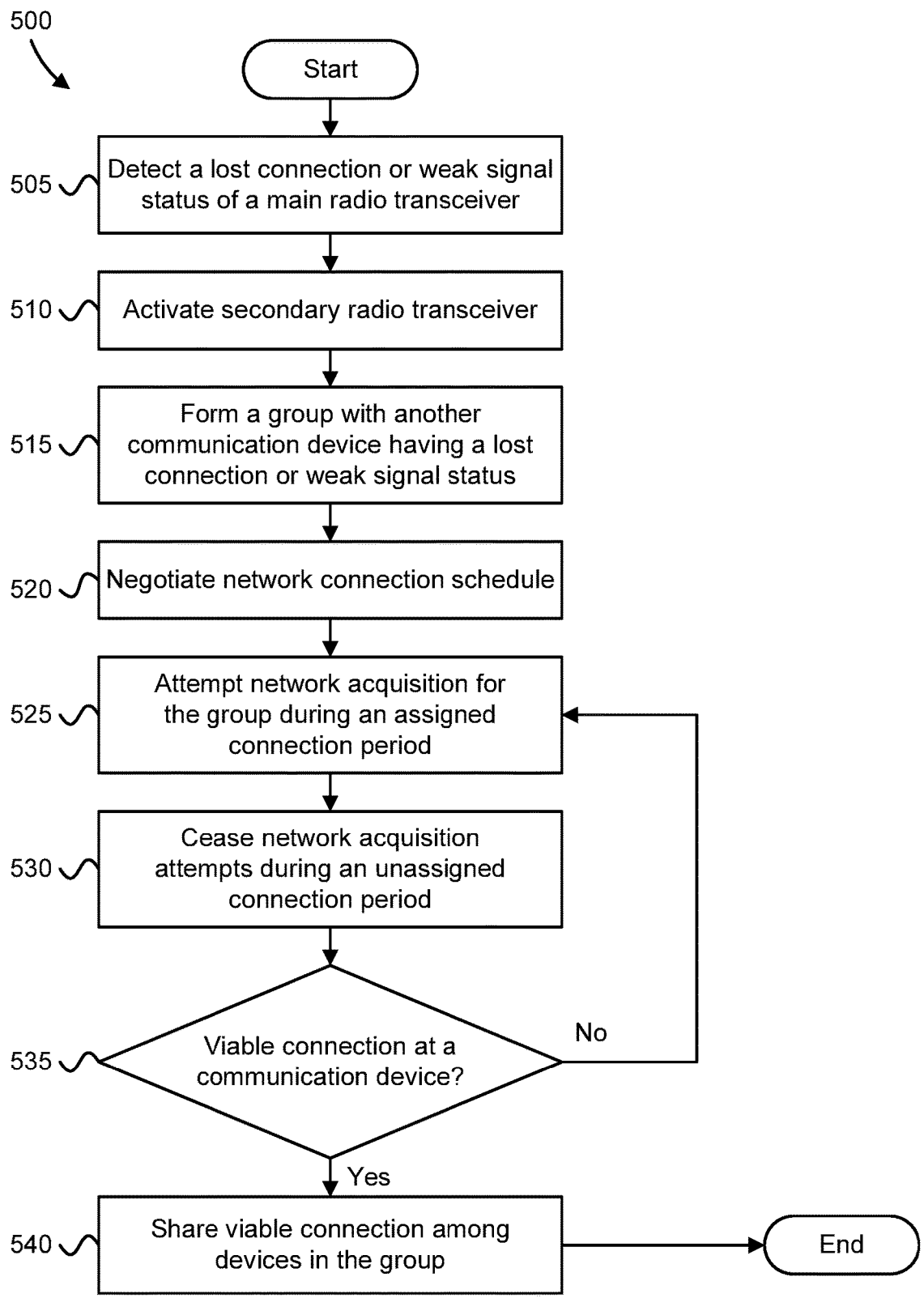
FIG. 5 is a schematic flow chart diagram illustrating another embodiment of a method for distributed network acquisition among a group of communication devices.

FIG. 5 is a schematic flow chart diagram illustrating a method 500 for distributed network acquisition among a group of communication devices. In one embodiment, the method 500 is performed by the computing device 150. In another embodiment, the method 500 may be performed by the apparatus 200. Alternatively, the method 500 may be performed by a processor 155 and a computer readable storage medium, such as the memory 160. The computer readable storage medium may store code that is executed on the processor 155 to perform the functions of the method 500.

The method 500 begins and detects 505 a lost connection or weak signal status for a main radio transceiver of a communication device. In one embodiment, the status module 205 detects 505 a lost connection or weak signal status for a main radio transceiver. In certain embodiments, the lost connection or weak signal status may be the absence of a network signal, a weak network signal, an unreliable network signal, a tower overload condition, and/or a wireless interference condition. In some embodiments, the lost connection or weak signal status may indicate a particular base station and/or mobile communication network.

The method 500 activates 510 a secondary radio transceiver. In one embodiment, the status module 205 activates 510 the secondary radio transceiver 190. In another embodiment, the radio selection module 225 activates 510 the secondary radio transceiver 195. In some embodiments, activating 510 the secondary radio transceiver includes detecting a network overload condition of the secondary radio transceiver and activating a tertiary radio transceiver in response to detecting the network overload condition. In one embodiment, the network overload condition is detected when a number of nearby users exceeds a threshold number.

The method 500 forms 515 a group with another communication device reporting a lost connection or weak signal status. In one embodiment, the group module 210 forms 515 a group with another communication device reporting a lost connection or weak signal status. In certain embodiments, forming 515 the group may include receiving a group invite from a nearby communication device. In one embodiment, the group invite may include a lost connection or weak signal status, a location, and/or device parameters of the inviting communication device. In such embodiments, the invited communication device may compare the connection status, location, and/or device parameters and accept the group invite in response to the connection status, location, and/or device parameters matching those of the invited communication device.

In some embodiments, forming 515 a group with another communication device includes polling for nearby communication devices and receiving a response from at least one nearby communication device. In one embodiment, a polling response includes a connection status for the responding communication device. In such embodiments, forming 515 the group may include transmitting a group invite to each nearby communication device reporting a lost connection or weak signal status. In other embodiments, forming 515 the group may include transmitting a group invite to each nearby communication device reporting the same lost connection or weak signal status as experienced by the main radio transceiver.

In some embodiments, forming 515 the group includes identifying device parameters for the host communication device (e.g., the communication device containing the main radio transceiver). Additionally, a polling response may include device parameters for the responding communication device. In such embodiments, forming 515 the group may include excluding each nearby communication device having device parameters different from the host communication device. Examples of device parameters include, but are not limited to, a class of device, an antenna size/type, and a mobile network provider.

The method 500 negotiates 520 a network connection schedule for the group. In one embodiment, the schedule module 220 negotiates 520 a network connection schedule for the group. The network connection schedule indicates a connection period assigned to each communication device belonging to the group. In some embodiments, negotiating 520 the network connection schedule includes receiving a power state for each communication device in the group. In such embodiments, negotiating the network connection schedule includes allocating (to each communication device in the group) a connection period sized based on the power state of each communication device.

The method 500 attempts 525 network acquisition during an assigned connection period. In one embodiment, the connection module 215 attempts 525 network acquisition during an assigned connection period. In some embodiments, attempting 525 network acquisition during the assigned connection period includes polling the network, searching for a base unit, listening for system information broadcast by the base unit, attempting to connect with a packet core, pinging an application server, and the like. In certain embodiments, attempting 525 network acquisition includes reporting to the group whether the network acquisition attempt is successful and/or updating a network connection status.

The method 500 ceases 530 network acquisition attempts during an unassigned connection period. In one embodiment, the connection module 215 ceases 530 network acquisition attempts during an unassigned connection period. In some embodiments, ceasing 530 network acquisition attempts during the unassigned connection period includes switching off the main radio transceiver. In certain embodiments, ceasing 530 network acquisition attempts during the unassigned connection period includes listening for network connection reports from the group and/or network connection status updates.

The method 500 determines 535 whether a communication device in the group has obtained a viable network connection. In one embodiment, the connection module 215 determines 535 whether a communication device in the group has obtained a viable network connection. In certain embodiments, determining 535 whether a communication device in the group has obtained a viable network connection includes determining a network acquisition attempt to be successful and reporting the viable network connection to the group. In some embodiments, determining 535 whether a communication device in the group has obtained a viable network connection includes receiving a viable network connection report from a communication device in the group.

In response to determining that a communication device in the group has obtained a viable network connection, the method 500 shares 540 the viable network connection among communications devices in the group. In one embodiment, the shared connection module 240 shares 540 the viable network connection among communication devices in the group. In certain embodiments, sharing. In some embodiments, sharing 540 a viable network connection includes receiving data from another communication device over the secondary radio transceiver and a forwarding the received data to the mobile communication network over the main radio transceiver. In certain embodiments, sharing 540 the viable network connection includes transmitting data to a nearby communication device reporting a viable network connection, wherein the nearby communication device routes the data to the mobile communication network over the viable network connection.

Otherwise, in response to determining that no communication device in the group has obtained a viable network connection, the method 500 continues to attempt 525 network acquisition for the group during an assigned connection period. The method 500 ends.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus comprising:
    a radio transceiver for communicating on a mobile communication network;
    a processor;
    a memory that stores code executable by the processor to:
        detect a connection status for a connection between the apparatus and the mobile communication network;
        determine whether the connection status is one of: a poor network connection and a lost connection state;

form a group with at least one second communication device in response to the connection status being a poor network connection or a lost connection state, the at least one second communication device being separate from the mobile communication network;

attempt network connection with the mobile communication network for the group during an assigned connection period, wherein the apparatus attempts network acquisition on behalf of the group during the assigned connection period; and cease network connection attempts with the mobile communication network during an unassigned connection period, wherein the at least one second communication device attempts network acquisition on behalf of the group during the unassigned connection period.

2. The apparatus of claim 1, further comprising code executable by the processor to:

receive a group invite from a nearby communication device reporting the connection status;

identify a device parameter of the nearby communication device; and accept the group invite based on the identified device parameter.

3. The apparatus of claim 2, further comprising code executable by the processor to:

activate a secondary radio transceiver in response to the connection status being a poor network connection or a lost connection state, wherein receiving the group invite comprises the processor receiving the group invite via the secondary radio transceiver.

4. The apparatus of claim 1, further comprising code executable by the processor to:

negotiate a network connection schedule for the group, wherein the network connection schedule indicates the assigned connection period and at least one unassigned connection period, the at least one unassigned connection period being assigned to at least one other communication device belonging to the group.

5. The apparatus of claim 1, further comprising code executable by the processor to:

communicate over the mobile communication network using a network connection shared by the group.

6. The apparatus of claim 1, wherein the processor further determines whether a power consumption of the network connection exceeds a threshold amount and forms the group in response to the network connection exceeding the threshold amount.

7. A method comprising:

detecting, by way of a processor, a connection status for a connection between a first communication device and a mobile communication network;

determining whether the connection status is one of: a poor network connection and a lost connection state;

forming a group with at least one second communication device in response to the connection status being a poor network connection or a lost connection state, the at least one second communication device being separate from the mobile communication network;

attempting network acquisition with the mobile communication network for the group during an assigned connection period, wherein the first communication device attempts network acquisition on behalf of the group during the assigned connection period; and ceasing network acquisition attempts with the mobile communication network during an unassigned connection period, wherein the at least one second communication device attempts network acquisition on behalf of the group during the unassigned connection period.

8. The method of claim 7, wherein forming a group with the at least one second communication device in response to the connection status being a poor network connection or a lost connection state comprises:

polling for nearby communication devices; and receiving a response from at least one nearby communication device, the at least one nearby communication device including the at least one second communication device, the response including a connection status for a connection between the responding communication device and the mobile communication network, wherein forming a group comprises transmitting a group invite to each nearby communication device reporting one of: a poor network connection and a lost connection state.

9. The method of claim 8, further comprising:

activating a secondary radio transceiver in response to the connection status being a poor network connection or a lost connection state, wherein the communication device communicates with the mobile communication network using a main radio transceiver; and polling for nearby communication devices via the secondary radio transceiver.

10. The method of claim 9, further comprising:

detecting a network overload condition of the secondary radio transceiver;

activating a tertiary radio transceiver in response to detecting the network overload condition;

polling for nearby communication devices using the tertiary radio transceiver; and reforming the group based on polling responses using the tertiary radio transceiver.

11. The method of claim 8, further comprising:

identifying device parameters for the communication device;

receiving device parameters for each nearby communication device responding to the poll, wherein forming a group further comprises excluding each nearby communication device having device parameters different from the identified device parameters.

12. The method of claim 7, further comprising:

negotiating a network connection schedule for the group, wherein the network connection schedule indicates the assigned connection period and at least one unassigned connection period.

13. The method of claim 12, further comprising:

receiving a power state for each communication device in the group, where negotiating the network connection schedule comprises allocating an amount of connection to each communication device in the group based on the power state for the communication device.

14. The method of claim 7, further comprising:

sharing a network connection with a communication device having in the group.

15. The method of claim 7, wherein forming a group comprises:

receiving a group invite from a nearby communication device;

determining whether the nearby communication device reports a lost connection status; and accepting the group invite in response to the nearby communication device reporting the lost connection status, the nearby communication device being a second communication device.

16. The method of claim 7, wherein the connection status indicates a particular mobile communication network, wherein forming a group with the at least one second communication device in response to the connection status being a poor network connection or a lost connection state comprises forming the group with a communication device that uses the particular mobile communication network.

17. A program product comprising a non-transitory computer readable storage medium that stores code executable by a processor, the executable code comprising code to perform:
- determining a connection status of a connection between a main radio transceiver of a first communication device and a mobile communication network;
- determining whether the connection status is one of: a poor network connection and a lost connection state;
- forming a group with at least one second communication device in response to the connection status being a poor network connection or a lost connection state, the at least one second communication device being separate from the mobile communication network;
- attempting, via the main radio transceiver, network acquisition with the mobile communication network during an assigned connection period, wherein the first communication device attempts network acquisition on behalf of the group during the assigned connection period; and
- ceasing network acquisition attempts with the mobile communication network during an unassigned connection period, wherein the at least one second communication device attempts network acquisition on behalf of the group during the unassigned connection period.

18. The program product of claim 17, the executable code further comprising code to perform:
- negotiating a network connection schedule for the group, wherein the network connection schedule indicates the assigned connection period and at least one unassigned connection period.

19. The program product of claim 17, the executable code further comprising code to perform:
- sharing a network connection with at least one communication device in the group.

20. The program product of claim 17, wherein the connection status indicates a particular mobile communication network, wherein forming a group with the at least one second communication device comprises one in the group with a communication device that uses the particular mobile communication network.

21. The program product of claim 17, further comprising determining whether the connection status indicates a network status selected from the group consisting of: an unreliable network signal, a tower overload condition, and a wireless interference condition, and forming the group with the at least one second communication device in response to the connection status indicating an unreliable network signal, a tower overload condition, or a wireless interference condition.

* * * * *